United States Patent
Jones

(10) Patent No.: US 7,226,116 B2
(45) Date of Patent: Jun. 5, 2007

(54) RECREATIONAL VEHICLE FULL WALL SLIDE-OUT

(75) Inventor: Thomas G. Jones, Riverside, CA (US)

(73) Assignee: Fleetwood Enterprises, Inc., Riverside, CA (US)

( * ) Notice: Subject to any disclaimer, the term of this patent is extended or adjusted under 35 U.S.C. 154(b) by 0 days.

(21) Appl. No.: 11/056,220

(22) Filed: Feb. 11, 2005

(65) Prior Publication Data

US 2006/0108829 A1    May 25, 2006

Related U.S. Application Data

(60) Provisional application No. 60/630,985, filed on Nov. 24, 2004.

(51) Int. Cl.
*B60P 3/34* (2006.01)

(52) U.S. Cl. .................... 296/175; 296/165; 296/26.02

(58) Field of Classification Search ............. 296/26.02, 296/26.05, 165, 171, 175
See application file for complete search history.

(56) References Cited

U.S. PATENT DOCUMENTS

| | | | |
|---|---|---|---|
| 2,150,615 A | 3/1939 | Sword | |
| 2,177,394 A | 10/1939 | Pierce | |
| 2,225,319 A | 12/1940 | Rollo | |
| 2,704,223 A | 3/1955 | Houdart | |
| 2,876,035 A | 3/1959 | Houdart | |
| 2,886,856 A | 5/1959 | Suk Kun Che | |
| 2,898,143 A | 8/1959 | Ferrera | |
| 2,898,144 A | 8/1959 | Ferrera | |
| 2,902,312 A | 9/1959 | Ferrera | |
| 2,965,412 A | 12/1960 | Henderson et al. | |
| 3,181,910 A | 5/1965 | Thomas | |
| 3,302,341 A | 2/1967 | Konopasek | |
| 3,719,386 A | 3/1973 | Puckett et al. | |
| 4,103,463 A * | 8/1978 | Dixon | 52/126.4 |
| 4,480,866 A | 11/1984 | Komatsu | 296/21 |
| 5,061,001 A | 10/1991 | Madden et al. | |
| 5,154,469 A * | 10/1992 | Morrow | 296/26.02 |
| 5,185,973 A | 2/1993 | Oldani | 52/64 |
| 5,237,782 A | 8/1993 | Cooper | 52/67 |
| 5,237,786 A * | 8/1993 | Kochansky | 52/126.4 |
| 5,248,180 A | 9/1993 | Hussaini | 296/171 |
| 5,291,701 A | 3/1994 | Delacollette et al. | 52/67 |
| 5,577,351 A | 11/1996 | Dewald, Jr. et al. | 52/67 |
| 5,658,031 A | 8/1997 | DiBiagio et al. | 296/26 |
| 5,706,616 A | 1/1998 | Fernandez | 52/143 |

(Continued)

FOREIGN PATENT DOCUMENTS

DE    43 00 785 A1    7/1994

(Continued)

*Primary Examiner*—Dennis H. Pedder

(57) ABSTRACT

A mobile recreational vehicle includes a body enclosing a living area designed to serve as self-contained living quarters during recreational travel. The body is supported on at least one pair of wheels (and often two or more pairs). The vehicle includes a ceiling assembly, a floor assembly; and an elongated and adjustable ceiling support extending between the ceiling assembly and the floor assembly wherein the height of the support can be adjusted during installation. In some instances, the vehicle has a shortened full length slide-out to allow for additional sidewall ceiling support, and in some instances has a slide-out opening that has cambered upper edges to minimize sagging the opening.

25 Claims, 8 Drawing Sheets

U.S. PATENT DOCUMENTS

| | | | |
|---|---|---|---|
| 5,732,839 A | 3/1998 | Schimmang et al. | 220/1.5 |
| 5,765,316 A | 6/1998 | Kavarsky | 52/67 |
| 5,816,639 A | 10/1998 | DiBiagio et al. | 296/26.13 |
| 5,951,082 A | 9/1999 | DiBiagio et al. | 296/26.13 |
| 6,098,346 A | 8/2000 | Miller et al. | 52/67 |
| 6,135,525 A | 10/2000 | Amann | 296/26.11 |
| 6,170,903 B1 | 1/2001 | Crean | 296/168 |
| 6,231,115 B1 * | 5/2001 | Crean | 296/171 |
| 6,243,992 B1 | 6/2001 | Gyllenhammar | 52/64 |
| 6,286,883 B1 | 9/2001 | Schneider et al. | 296/26.14 |
| 6,290,284 B1 | 9/2001 | Crean | 296/168 |
| 6,293,612 B1 | 9/2001 | Crean | 296/175 |
| 6,299,229 B1 | 10/2001 | Becenas Nieto | 296/24.1 |
| D460,721 S | 7/2002 | Rex | |
| D461,144 S | 8/2002 | Rex | |
| 6,729,677 B2 | 5/2004 | Gurdjian et al. | 296/156 |
| 6,886,875 B1 * | 5/2005 | Crean | 296/26.13 |
| 2001/0004159 A1 | 6/2001 | Crean | 296/171 |
| 2002/0043812 A1 | 4/2002 | Crean | 296/26.13 |
| 2002/0047291 A1 | 4/2002 | Crean | 296/168 |

FOREIGN PATENT DOCUMENTS

EP      083 317 A 2      6/1982

* cited by examiner

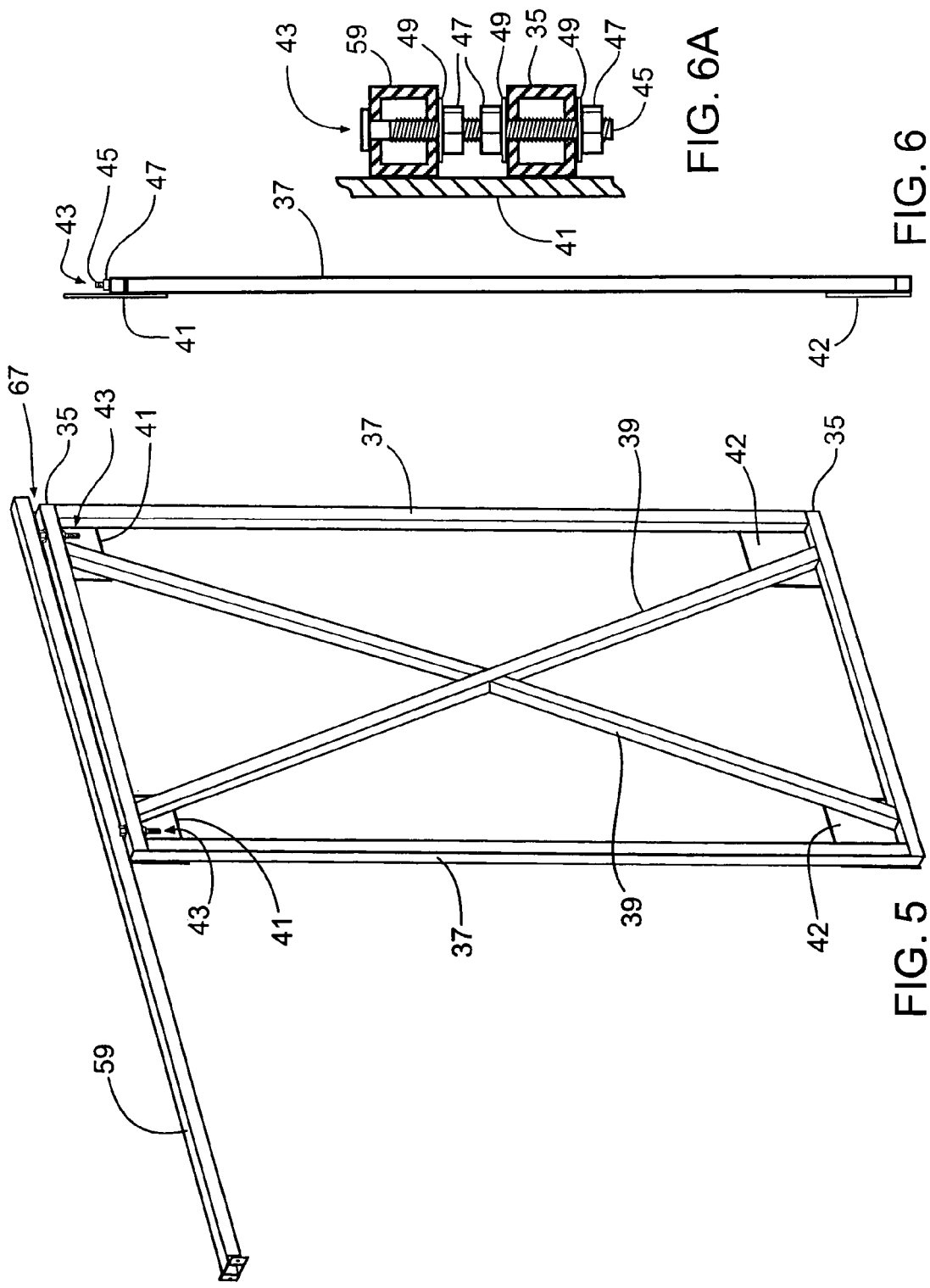

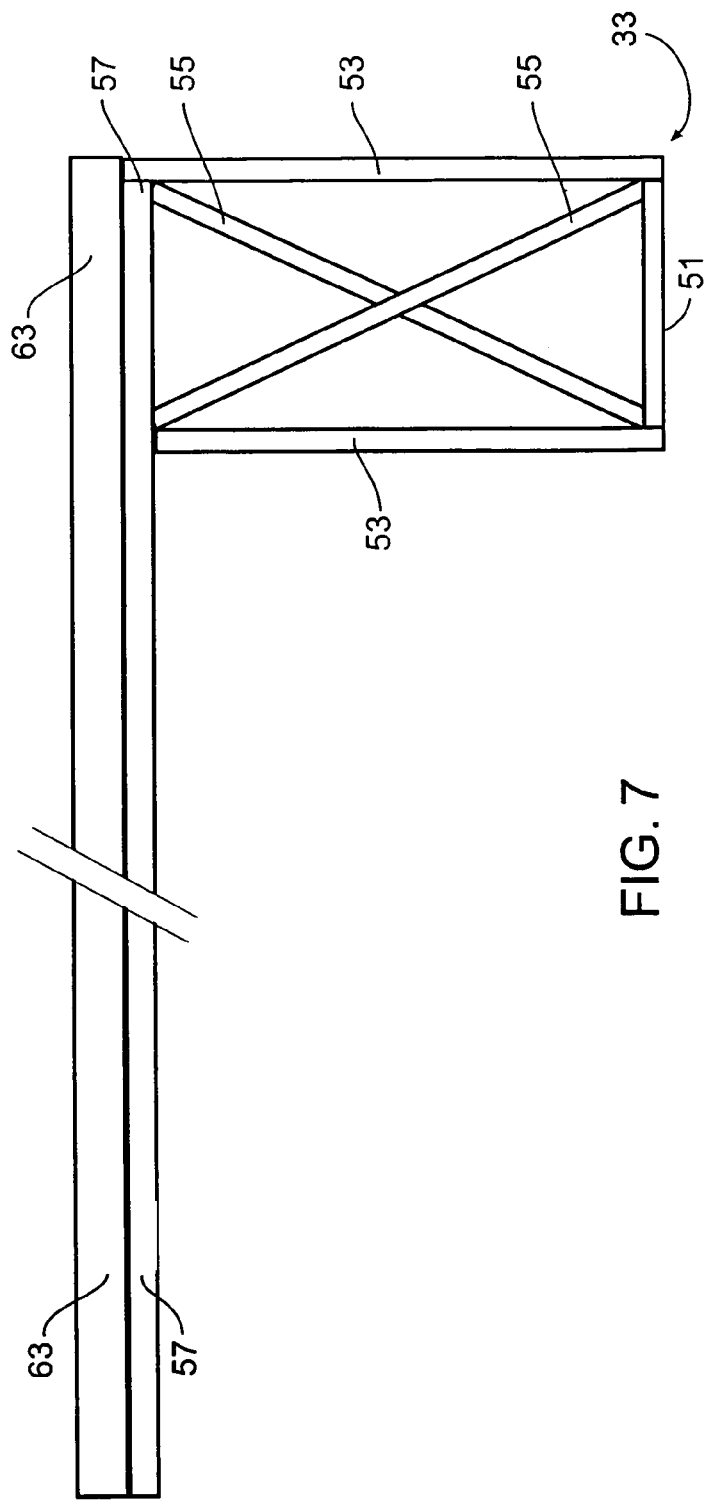
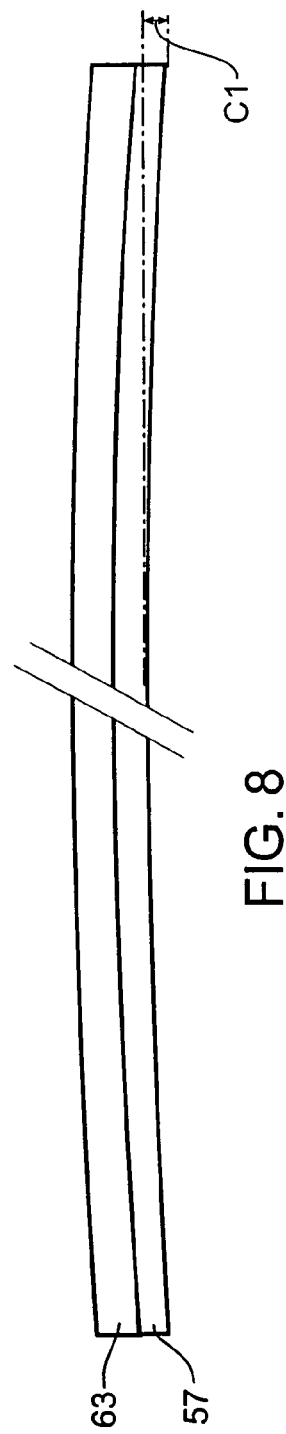
FIG. 7
FIG. 8

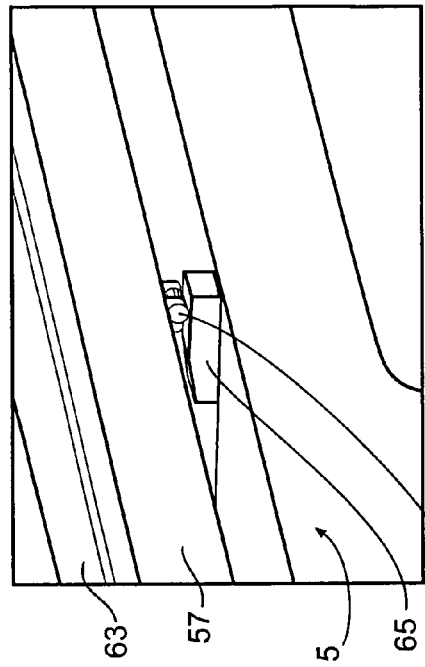
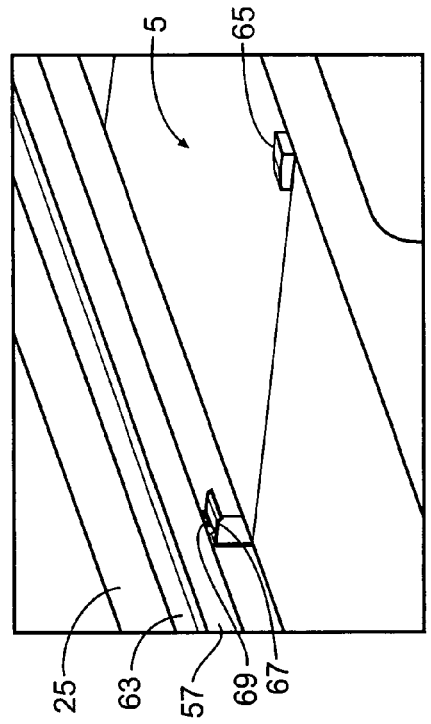
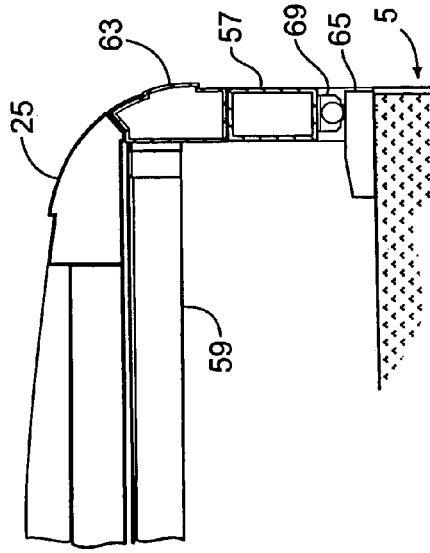
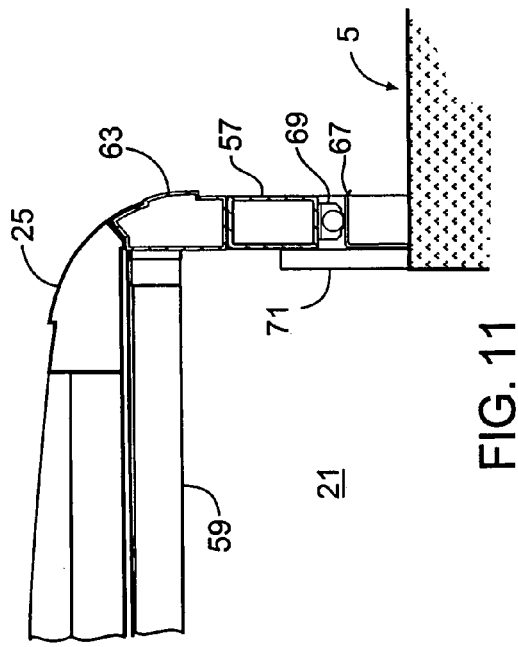

RECREATIONAL VEHICLE FULL WALL SLIDE-OUT

CROSS-REFERENCES TO RELATED APPLICATIONS

This application claims the benefit of Provisional Application No. 60/630,985, filed Nov. 24, 2004.

FIELD OF THE INVENTION

The present invention relates generally to recreational vehicles.

BACKGROUND OF THE INVENTION

Recreational vehicles that are intended to be moved between locations at which they function as temporary housing benefit from having living areas that can be increased when the vehicles are not being transported. One way to provide an expandable living area is to use a slide-out. A slide-out typically has three walls, a floor, and a ceiling, and fits within a larger central living area when a vehicle is being transported, and is slid out to extend outward from a side of the vehicle when it is not being transported. Examples of vehicles with slide-outs can be found in at least U.S. Pat. Nos. 6,623,058, 6,293,612, 6,290,284, 6,286,883, 6,170,903, 6,135,525, 6,098,346, 5,248,180, 4,480,866, 3,719,386, 2,965,412, 2,704,203, 2,225,319, and 2,177,394, herein incorporated by reference in their entireties.

Over time, recreational vehicle size has increased. Vehicle size increases, particularly increases in length, have made it desirable to increase slide-out lengths as a full wall slide-out (i.e. a slide-out extending along more than half of the length of the side of the vehicle it slides out from) provides a larger increase in living area than a shorter slide-out. Unfortunately, increased slide-out length presents difficulties in vehicle design that have yet to be overcome. As such, there is a need for improved vehicle structures and construction methods that facilitate the use of extended length slide-outs.

SUMMARY OF THE INVENTION

The present invention is directed to a mobile recreational vehicle including a body enclosing a living area designed to serve as self-contained living quarters during recreational travel, where the body is supported on at least one pair of wheels (and often two or more pairs). The vehicle includes a ceiling assembly, a floor assembly; and an elongated and adjustable ceiling support extending between the ceiling assembly and the floor assembly wherein the height of the support can be adjusted during installation. The present invention is also directed to mobile recreational vehicles having shortened full length slide-outs to allow for additional side ceiling support, and for mobile recreational vehicles that have slide-out openings that have cambered upper edges to minimize sagging of such openings with minimal vertical supports.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 5 is a perspective view of an adjustable center ceiling support of the support frame of FIG. 3;
FIG. 6 is a side view of the support of FIG. 5;
FIG. 6A is a cutaway view of the top portion of FIG. 5;
FIG. 7 is a partial side view of a portion of the sidewall support framing of the frame of FIG. 3 that includes a sidewall ceiling support;
FIG. 8 is an exaggerated illustration of the cambering of a portion of the support frame of the vehicle of FIG. 3;
FIG. 9 is a cutaway view of the vehicle of FIG. 1 with the slide-out retracted;
FIG. 10 is a partial perspective view of the vehicle of FIG. 1 with the slide-out retracted;
FIG. 11 is a cutaway view of the vehicle of FIG. 1 with the slide-out extended;
FIG. 12 is a partial perspective view of the vehicle of FIG. 1 with the slide-out extended.

DETAILED DESCRIPTION OF THE PREFERRED EMBODIMENTS

Figure 1:
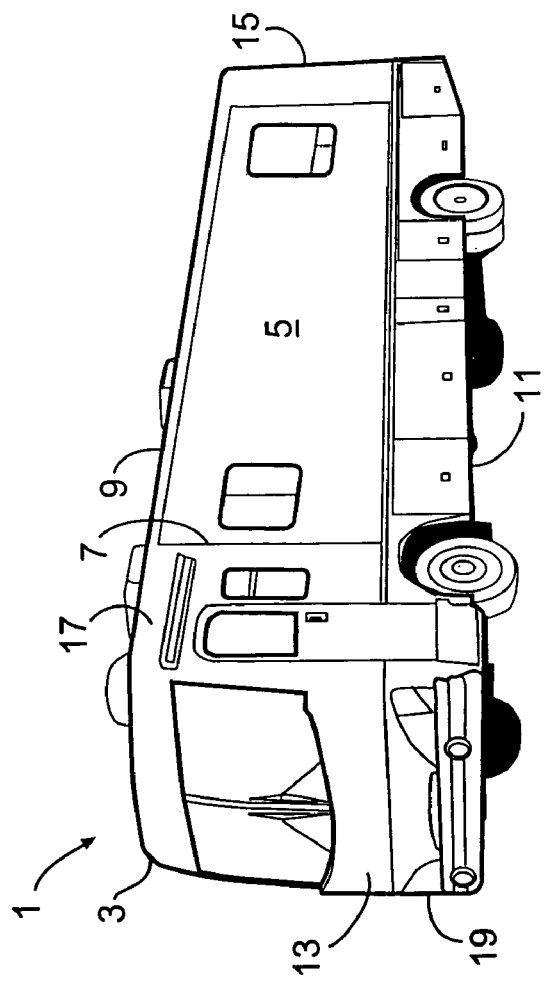
FIG. 1 is a perspective view of a recreational vehicle.

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention. Moreover, the embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described.

Although recreational vehicles slide-outs have been in use for several decades, recent increases in vehicle size and in expectations regarding vehicle weight, durability, and features necessitate improvements in vehicle structure that have not previously been provided. As an example, as slide-out length increases, the length of slide-out openings increases with a corresponding decrease in the amount of ceiling structure support provided by the sidewalls. The decrease in support occurs in regard to both vertical movement of the ceiling structure as well as in regard to lateral movement, twisting, and vibration of the ceiling structure. Decreased support is an issue both when the vehicle is in motion with any slide-outs retracted, and when the vehicle is at rest with slide-outs extended.

Compensating for the decreased support is complicated by the fact that it is undesirable to fill the expanded living area of the recreational vehicle with supports. Further complications arise from the fact that it is desirable to keep the total vehicle weight to a minimum, and to minimize the cost, at least in regard to time, labor, and materials, of manufacturing the vehicle.

As will be discussed herein, a balance between conflicting design criteria is achieved through the use of one or more of the following: a shallower slide-out coupled with an adjustable center ceiling support, a shortened sidewall coupled with a sidewall ceiling support, and a cambered horizontal support positioned above the slide-out opening. The term "shortened" in this instance indicates that, although it is desirable to maximize the length of the slide-out, it is beneficial in some instances to sacrifice some of the length to a sidewall ceiling support. As such, a "full wall" slide-out as described herein is any slide-out that extends along at least 50% of the length of the vehicle, and preferably extends at least 70% of the length of the vehicle.

Figure 2:
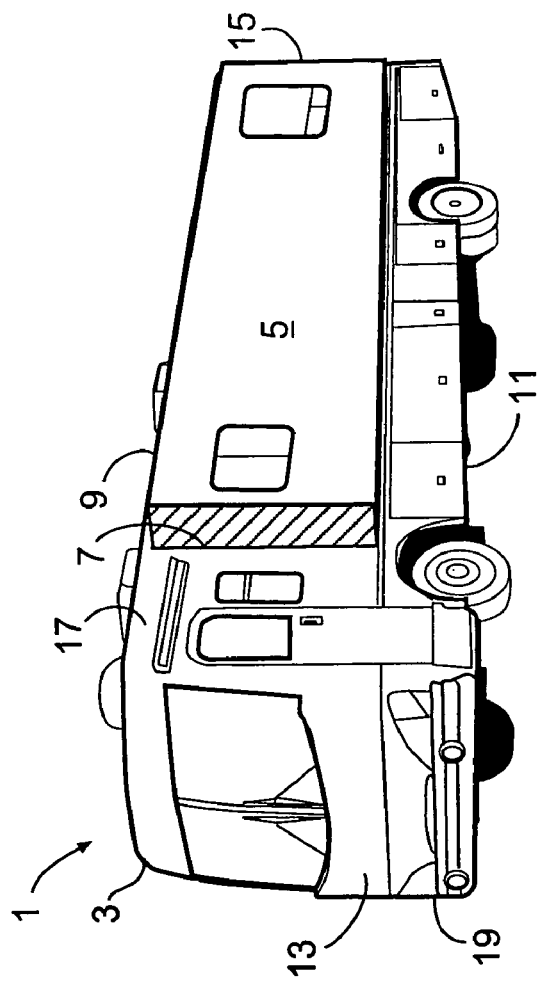
FIG. 2 is a perspective view of the vehicle of FIG. 1 with an extended slide-out.

Referring primarily to FIGS. 1 and 2, a recreational vehicle 1 that is a motor-home comprises a hull 3, a full wall slide-out 5, and a slide-out opening 7, as well as a top/ceiling/roof 9, a bottom/floor 11, a front 13, a rear 15, a right side 17, and a left side 19. In FIG. 1, the slide-out 5 is in a retracted position, and in FIG. 2 is in an extended position. Extending the slide-out 5 increases the size of an expandable living area cavity 21 (see FIGS. 3 and 11) enclosed by the ceiling 9, the floor 11, the front 13, the rear 15, the sides 17 and 19, and slide-out 5. In addition to the features shown, the vehicle 1 will typically comprise a gas or diesel engine, a transmission, a cab including controls used while driving the vehicle 1, and also including a driver's seat and a passenger seat positioned to facilitate control of the vehicle while looking out the front of the vehicle.

Figure 13:
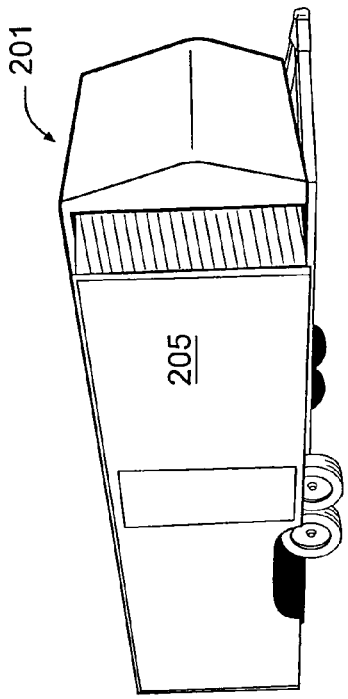
FIG. 13 is a perspective view of an alternative recreational vehicle.
Figure 14:
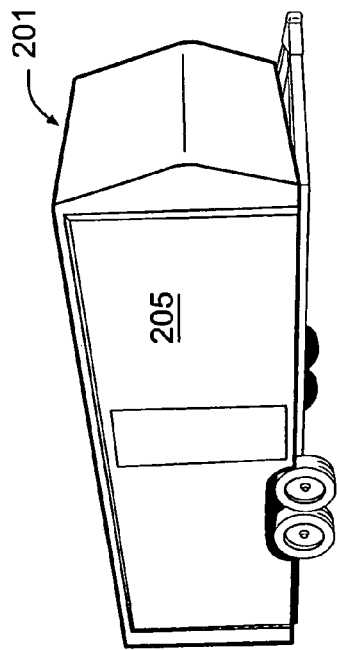
FIG. 14 is a perspective view of the vehicle of FIG. 13 with an extended slide-out
Figure 15:
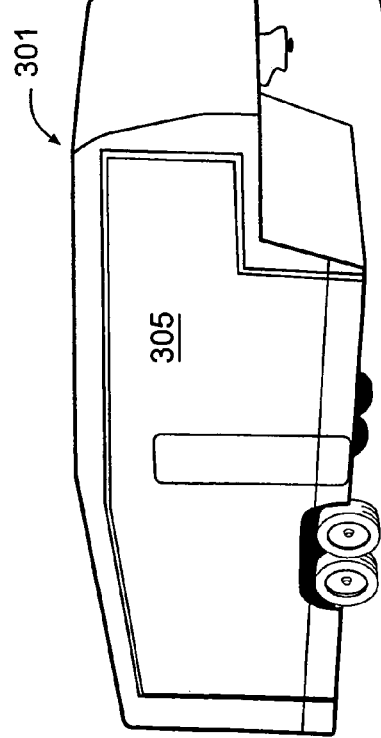
FIG. 15 is a perspective view of another alternative recreational vehicle.
Figure 16:
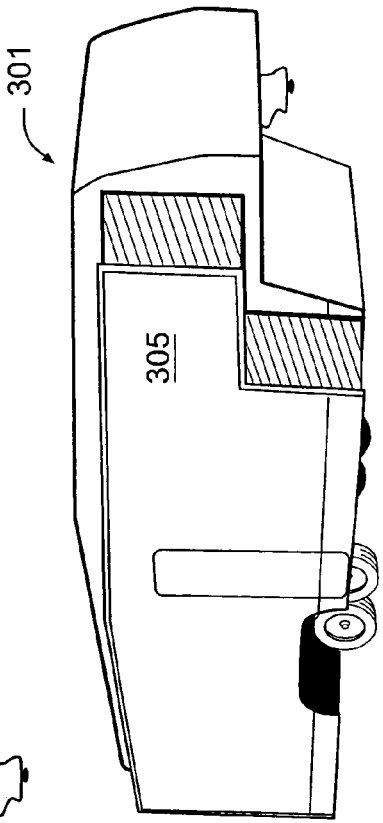
FIG. 16 is a perspective view of the vehicle of FIG. 15 with an extended slide-out

Although most of the figures depict a motor-home, the methods and apparatus disclosed herein are equally applicable to other recreational vehicles, and particularly to recreational vehicles comprising a mobile chassis. As such, the term recreational vehicle includes at least motor-homes and travel trailers. As an example, in FIGS. 13 and 14 a recreational vehicle 201 that is a standard travel trailer is shown with its slide-out 205 retracted and extended. In FIGS. 15 and 16, a recreational vehicle 301 that is a fifth wheel travel trailer is shown with its slide-out 305 retracted and extended.

Figure 17:
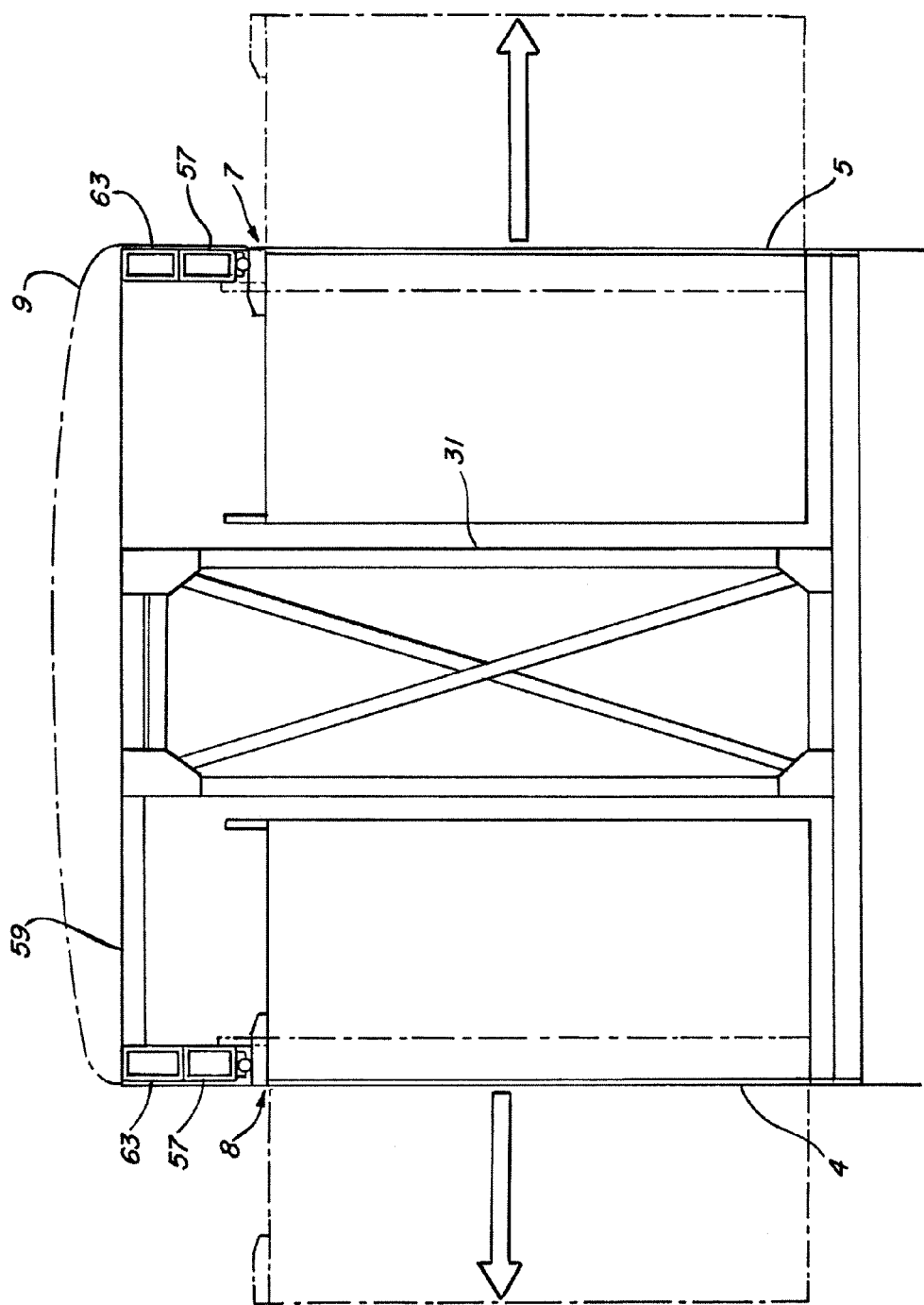
FIG. 17 is a schematic cross sectional view of a recreational vehicle body having an adjustable ceiling support between two slide outs.

Although the figures depict a single slide-out embodiment, the features described are also applicable to vehicles comprising multiple slide-outs as vehicles having both left and right slide-outs as shown in FIG. 17. A first vehicle sidewall can include a first slide-out opening 8 having a cambered upper edge extending along at least 50% of the length of the vehicle. A first slide-out 4 is positioned within the first slide-out opening 8 so that the first slide-out is moveable relative to the first sidewall. A second vehicle sidewall, opposite the first vehicle sidewall, includes a second slide-out opening 7 having a cambered upper edge extending along at least 50% of the length of the vehicle. A second slide-out 5 is positioned within the second slide-out opening 7 and moveable relative to the second sidewall, wherein the cross-braced ceiling support 31 is sufficiently narrow and is positioned such that it fits between the first and second slide-outs regardless of the extended or retracted position of the first and second slide-outs.

Figure 3:
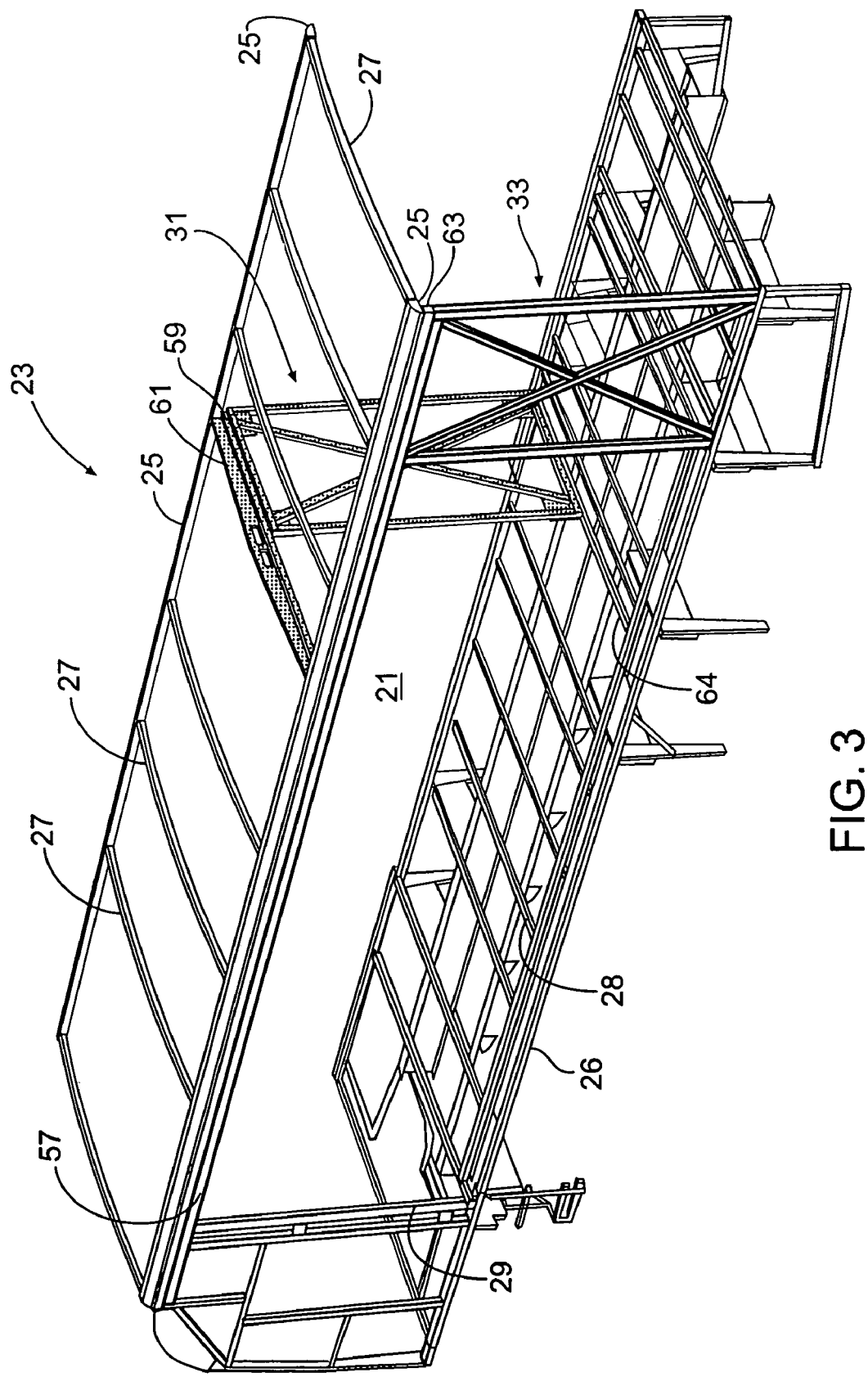
FIG. 3 is a left perspective view of the a support frame of the vehicle of FIG. 1.
Figure 4:
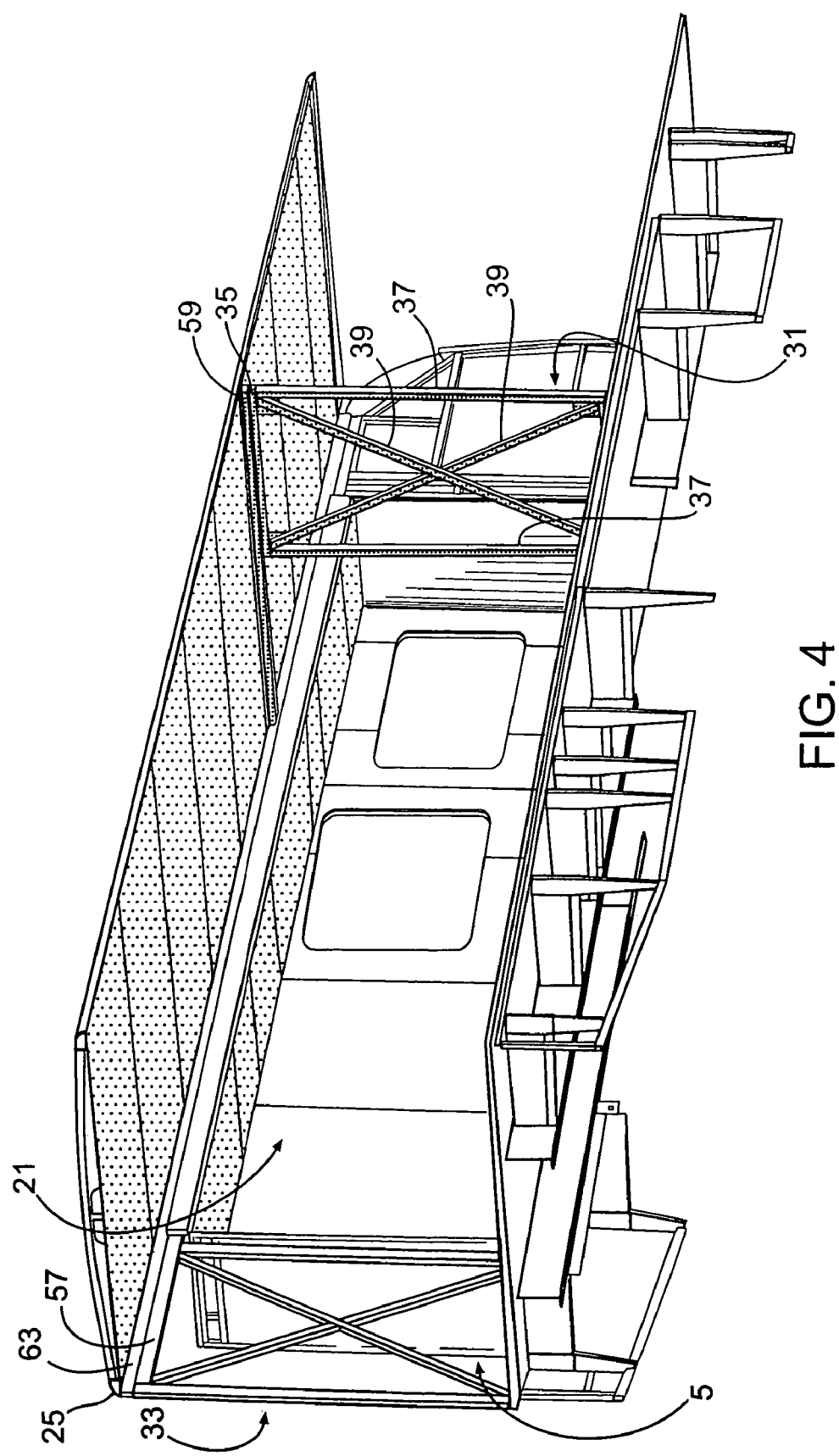
FIG. 4 is a right perspective view of the support frame and slide-out of the vehicle of FIG. 1.

Referring to FIGS. 3 and 4, the hull 3 of the vehicle 1 comprises an internal support frame 23. The roof/ceiling portion of the frame 23 includes longitudinal supports ("ceiling extrusions") 25 and transverse supports ("ceiling ribs") 27. The ceiling extrusions 25 and the ceiling ribs are preferably pre-assembled into a layered ceiling assembly having an external roof/skin layer separated from an internal ceiling layer by an insulating layer that includes the ceiling ribs and ceiling extrusions. After a substantial portion of the floor and sidewalls of the frame 23 are assembled, the ceiling assembly can be put in place as a single piece. The frame 23 also includes vertical supports 29, an adjustable center ceiling support 31, a sidewall ceiling support 33, cambered tubular members 57 and 63, an adjustable center ceiling support receiving transverse support ("transverse cantilever") 59, lower longitudinal supports 26, lower transverse supports 28, a lower transverse support 64, and a ceiling support arch 61. The supports 31 and 33 help support the layered ceiling assembly of ceiling 9. The support 33, members 57 and 63, and vertical support 29 are preferably incorporated into a pre-assembled sidewall in a manner similar to the roof/ceiling portion of the frame 23.

The arch support 61 is coupled to a top surface of the transverse cantilever 59 and comprises one or more openings extending through it to facilitate routing of wires and the like. The arch support 61 maintains a minimum distance between the transverse cantilever 59 and any points on the roof/ceiling assembly immediately above the arch support 61.

In addition, to the elements shown, a recreational vehicle hull will typically comprise one or more of the following: external and internal panels including or covering support frame 23, windows permitting light and/or air to pass through the sides of the hull 3, vents permitting air to pass through the sides, floor, and/or ceiling of the hull 3, exterior access doors permitting entry into the living area cavity 21, dividers for dividing the living area cavity 21 into smaller areas, cabinets for storage, interior doors permitting movement between rooms, and electrical and plumbing components.

Referring to FIGS. 5, 6, and 6A, the adjustable center ceiling support 31 comprises horizontal members 35, vertical members 37, cross-braces 39, alignment plates 41, support plates 42, and adjustment assemblies 43. The adjustment assemblies 43 each comprise an adjustment bolt 45, nuts 47, and washers 49. The members 35 and 37 and braces 39 may be hollow or solid, comprise a single pieces or an assembly of pieces, and/or comprise a single material or a plurality of materials. Moreover, the members 35 and 37 may be coupled together in any manner. However, in some instances it may be advantageous if the support 31 comprised steel or aluminum tubing welded together such that the members 35 and 37 form a rectangular frame with the cross-braces 39 extending between points at or near the internal corners of the frame. In the embodiment shown, the cross-braces 39 are coupled to the horizontal members 35 at points near but not in the corners of the rectangle formed by the members 35 and 37. Positioning the ends of the members 39 away from the members 37 allows the adjustment assemblies 43 to be positioned closer to the members 37. The plates 41 and 42 add rigidity to the support 31. Having the plates 41 extend beyond the edge formed by the upper horizontal member 35 allows the plates 41 to be used to align the support 31 under the transverse cantilever 59. There will typically be a gap 67 between an upper horizontal member 35 and transverse cantilever 59. The size of the gap 67 as well as the distance between supports 59 and 64 can be adjusted using the adjustment assemblies 43.

Although the size and dimensions of the support 31 may vary between embodiments, it is preferred that it fit between the ceiling and the floor of the living area, i.e. between the ceiling ribs 27 and the lower transverse supports 28. As shown, the support 31 fits between the transverse cantilever 59 and a lower transverse support 64. It is contemplated that in some instances the support 31 will have a width between 24 and 48 inches, a height without including adjustment assemblies between 79 and 96 inches, and adjustment assemblies that can maintain a maximum sidewall opening size of between 76 and 93 inches, and will be able to support static loads of at least 400 pounds.

Although a single support 31 is shown, in some instances an embodiment may comprise two or more supports 31. Although shown positioned in the center of vehicle 1 and perpendicular to the side comprising the slide-out, in some instances the support 31 may be positioned other than in the center of the vehicle and/or other than perpendicular to the slide-out side(s). Although shown comprising bolts, nuts, and washers, the adjustment assemblies 43 may comprise any mechanism that supports the ceiling 9 of the hull 3 but allows the distance between the ceiling ribs 27 and the lower transverse supports 28 adjacent to support the 31 to be adjusted. An alternative mechanism might include a pivot opposite of the slide-out 5 and a single adjustment assembly.

The adjustment assemblies 43 can be operated to increase or decrease the gap 67 between an upper horizontal member 35 and the transverse cantilever 59. Both the transverse cantilever 59 and the upper member 35 will include holes through which the bolts 45 pass with the nuts 47 and the washers 49 being used to fasten the bolts 45 in place, and to establish the size of the gap 67. The bolts 45 are preferably welded to the transverse cantilever 59. As such, the nuts 47 adjacent to transverse cantilever 59 shown in the figures may in some instances be eliminated as they are not necessary to prevent movement of the bolts 45 relative to the transverse cantilever 59. It should be noted that the transverse cantilever 59 is rotatable relative to the upper member 35 in that the angle at which it extends from the support 31 can be adjusted using the adjustment assemblies 43. It is contemplated that having adjustment assemblies that can be operated independently of each other so as to be able to adjust the slope of the transverse cantilever 59 in such a manner provides a number of advantages.

Referring to FIG. 7, the sidewall ceiling support 33 comprises horizontal members 51, portions of 57 and 63, vertical members 53, and cross-braces 55. The members 51, 53, 57, and 63 and braces 55 may be hollow or solid, comprise single pieces or an assembly of pieces, and/or comprise a single material or a plurality of materials. Moreover, the members 51, 53, 55 and 57 may be coupled together in any manner. However, in some instances it may be advantageous if the support 33 comprised aluminum tubing welded together such that the members 51, 53, and 55, and a portion of the members 57 and 63, form a rectangular frame with the cross-braces 55 extending between the internal corners of the frame.

Although the size and dimensions of the support 33 may vary between embodiments, it is advantageous to have the support 33 have a height (vertical length) at least equal to the height of the opening 7, and to have a smaller width. If the slide-out 5 extends along most of the length of the side 19 of the hull 3, a single support 33 may extend as shown between an edge of the opening 7 and the rear 15 of the hull 3. In other instances, a plurality of adjacent supports 33 may extend between a side of the slide-out opening and the front 13 and/or the rear 15 of the hull 3. In some instances, a slide-out opening may comprise supports 33 adjacent to both ends of the slide-out opening. It is contemplated that in some instances the support 33 will have a height between 79 and 96 inches and a width between 18 and 48 inches, and will be able to support static loads of at least 1200 pounds.

Although increased slide-out lengths are desirable, reducing the slide-out length in order to enable the adjustable support 33 to be positioned in an end portion of the side 19 adjacent to the opening 7 provides substantial improvement in the support provided to the ceiling assembly. Similarly, reducing slide-out depth enables the adjustable ceiling support 31 to be positioned perpendicular to the support 33 without interfering with the slide-out 5 as it is retracted, and possibly without interfering with a second slide out 4 opposite the slide out 5 when both slide-outs are retracted, see FIG. 17.

Referring to FIGS. 3, 4, 7 and 8, the cambered tubular longitudinal support members 57 and 63, that form a cambered assembly, are positioned above the slide-out opening 7 and help counter any tendency of the upper edge of the opening 7 to sag. The members 57 and 63 are cambered such that there is a 0.5 to 1.5 inch gap C1 between a center point of the member 57 and a straight line extending between the ends of the member 57. This cambering is achieved by flexing the members 57 and 63 while they are adjacent to each other but not coupled together, and then welding the members 57 and 63 together to prevent them from sliding relative to each other such that they remain cambered. The member 57 and 63 are preferably at least as long as the length of the slide-out opening 7. In some instances the length of the members 57 and 63 will be between 18 and 36 feet.

As can be seen, the cambered assembly members 57 and 63, the adjustable ceiling support 31, and the adjustable sidewall ceiling support 33 are all coupled together as part of the support frame 23 with the supports 31 and 33 being perpendicular to each other, and the support 33 and the members 57 and 63 being parallel or coplanar to each other. The support 33 incorporates an end of each of the members 57 and 63 which are welded together. The support 31 is coupled to transverse cantilever 59 which in turn is coupled to cambered member 63. The adjustable ceiling support or adjustable support unit 31 is preferably positioned between the ceiling support arch 61 in the ceiling assembly and the lower traverse support 64 in the floor assembly.

In FIGS. 9–12, a roller assembly is pictured which can add additional support to the cambered members 57 and 63 when the slide-out 5 is either fully retracted or fully extended. As shown, a roller assembly 69 is coupled to member 57 and is aligned with roller biasing members 65 and 67 which are coupled to an upper surface/ceiling of the slide-out 5. Retracting the slide-out 5 places the roller biasing member 65 in contact with the roller assembly 69 so as to push the ceiling support 57 away from the slide-out 5. Extending the slide-out 5 also places the roller biasing member 67 in contact with the roller assembly 69 so as to push the member 57 away from the slide-out 5. As such, when retracted or extended, the slide-out 5, roller assembly 69, and one of the biasing members 65 and 67 function to push the member 57 upward. This has numerous advantages such as decreasing relative movement between the ceiling 9 and the slide-out 5 during travel, and providing additional support to the ceiling 9.

It should be noted that the biasing member 67 extends further from the slide-out 5 than does the biasing member 65. This permits the slide-out 5 to move downward relative to the rest of hull 3 such that a floor of the slide-out is substantially co-planar to the rest of the floor of the living area when the slide-out is extended even though the slide-out must be raised above the living area floor when the slide-out is retracted. As can be seen, the biasing member 67 is preferably a bracket that first extends upward against the wall 71 (which may function to stop movement of the slide-out 5 out of the living area 21, and/or fills the gap left between the member 57 and the top of the slide-out 5. The bracket has a sloped portion positioned to initially contact the roller assembly 69 as the slide-out 5 is extended. The biasing member 65 is preferably a solid block that has a sloped portion to initially contact the roller assembly 69 as the slide-out 5 is retracted.

A method of manufacturing a mobile recreational vehicle as described herein may include one or more of the following steps: (a) providing an elongated and adjustable ceiling support; (b) adjusting and positioning the support such that it has a desired height and extends between the floor assembly and the ceiling assembly; and (c) adjusting the height of the adjustable support to obtain a desired vertical dimension of at least a portion of the slide-out opening. In some instances, adjusting the height of the support may include rotating an elongated support member coupled to the adjustable support and extending between the adjustable support and an upper edge of the opening in the side wall.

What is claimed is:

1. A mobile recreational vehicle including a body enclosing an expandable living area where the body is supported on at least one pair of wheels, the vehicle comprising:
    a ceiling assembly;
    a floor assembly;
    an adjustable ceiling support extending between the ceiling assembly and the floor assembly wherein the height of the support can be adjusted during installation; and
    at least one slide-out movable between a retracted storage position and an extended operative position within an opening in a side wall of the vehicle between the floor and ceiling assemblies, wherein,
    the vertical dimension of at least a portion of the opening is at least partially determined by a set height of the adjustable ceiling support,
    wherein the side wall comprises a cambered assembly positioned above and extending at least partially along the length of the opening.

2. The vehicle of claim 1 whereby the vehicle is a travel trailer.

3. The vehicle of claim 1 whereby the vehicle is a motor-home.

4. The vehicle of claim 1 wherein the cambered assembly comprises two longitudinal supports welded together and at least one longitudinal support has a gap of about 0.5 inches to 1.5 inches between a center point along its length and an imaginary straight line extending between its ends.

5. The vehicle of claim 4 wherein the adjustable ceiling support is connected to the cambered assembly by a traverse cantilever member.

6. The vehicle of claim 5 wherein the adjustable ceiling support comprises two adjustment assemblies rotatably coupling the traverse cantilever member to the adjustable ceiling support.

7. The vehicle of claim 6 further comprising a cross braced sidewall ceiling support perpendicular to the adjustable ceiling support, and co-planar with or parallel to the cambered extrusion assembly.

8. The vehicle of claim 7 further comprising:
    at least one ceiling support roller assembly coupled to the at least two longitudinal supports;
    a first roller biasing member coupled to the at least one slide-out; and
    a second roller biasing member coupled to the at least one slide-out; wherein
    retracting the slide-out places the first roller biasing member in contact with the roller assembly so as to push the at least one ceiling support away from the slide-out; and
    extending the slide-out places the second roller biasing member in contact with the roller assembly so as to push the at least one ceiling support away from the slide-out.

9. The vehicle of claim 8 wherein a portion of the second roller biasing member that contacts the ceiling support roller assembly is positioned further out from a ceiling portion of the slide-out than is a portion of the first roller biasing member that contacts the ceiling support roller assembly.

10. A mobile recreational vehicle including a body enclosing an expandable living area where the body is supported on a mobile chassis, the vehicle comprising:
    a ceiling assembly;
    a floor assembly;
    a first sidewall including a first slide-out opening having a cambered assembly upper edge extending along at least 50% of the length of the vehicle; and
    a first slide-out within the first slide-out opening, the first slide-out being moveable relative to the first sidewall.

11. The vehicle of claim 10 wherein the cambered assembly upper edge is connected to a cantilever member that is perpendicular to the slide-out opening and the cantilevered member is adjustably coupled to a cross-braced ceiling support that is also perpendicular to the slide-out opening.

12. The vehicle of claim 11 wherein the vehicle further comprises:
    a second sidewall opposite the first sidewall, the second sidewall including a second slide-out opening having a cambered assembly upper edge extending along at least 50% of the length of the vehicle; and
    a second slide-out within the second slide-out opening, the second slide-out being moveable relative to the second sidewall;
    wherein the cross-braced ceiling support is sufficient narrow and is positioned such that it fits between the first and second slide-outs regardless of the position of the first and second slide-outs.

13. A method of manufacturing a mobile recreational vehicle including a body enclosing a living area designed to serve as self-contained living quarters for recreational travel wherein the body is supported on at least one pair of wheels, and the vehicle includes a slide out unit, a sidewall with an opening for the slide out unit so that the slide out unit can be operatively extended outward to increase space, a ceiling assembly and a floor assembly, the sidewall opening having an upper edge support member, the method comprising:

providing a cantilever support member extending across the ceiling assembly to operatively connect to the upper edge support member;

providing an adjustable ceiling support connected to the cantilever support member; and positioning the adjustable ceiling support to adjust a vertical height of at least a portion of the upper edge support member to obtain a predetermined vertical dimension of at least a portion of the sidewall opening.

14. The method of manufacturing of claim 13 further including providing a cambered upper edge assembly as the upper edge support member.

15. The method of manufacturing of claim 14 wherein the cambered upper edge support assembly is formed by connecting two longitudinal tubular members together to extend upward at an intermediate point between ends of the longitudinal tubular members relative to the longitudinal tubular members respective ends to counter sagging of the upper edge support member.

16. In a mobile recreational vehicle including a body enclosing an expandable living area having at least one side slide-out movable between a retracted storage position and an extended operative position for use when the mobile recreational vehicle is stationary, the improvement comprising:

a first sidewall on the recreational vehicle including a first slide-out opening having a first cambered upper edge assembly, and a first slide-out mounted to extend into and out of the first slide-out opening underneath the first cambered upper edge assembly;

a cantilevered member connected to the first cambered upper edge assembly at a first end of the cantilevered member; and an adjustable support unit also connected to the cantilevered member for adjusting a vertical height of at least a portion of the first cambered upper edge assembly to obtain a predetermined vertical dimension of at least a portion of the first sidewall opening.

17. The mobile recreational vehicle of claim 16 further comprising:

a second sidewall on the recreational vehicle including a second slide out opening have a second cambered upper edge assembly; and a second slide-out mounted to extend into and out of the second slide-out opening underneath the second cambered upper edge assembly.

18. The method of manufacturing of claim 15 further including the cantilevered member connected to the cambered upper edge assembly at a first end of the cantilevered member and an adjustable support unit is also connected to the cantilevered member for adjusting a vertical height of at least a portion of the cambered upper edge assembly to obtain a predetermined vertical dimension of at least a portion of the first sidewall opening.

19. A mobile recreational vehicle comprising:

a body enclosing an expandable living area having at least one slide-out movable between a retracted storage position and an extended operative position for use when the mobile recreational vehicle is stationary, and a first sidewall on the recreational vehicle including a first slide-out opening having a first cambered upper edge assembly, and a first slide-out mounted to extend into and out of the first slide-out opening underneath the first cambered upper edge assembly, wherein the first cambered upper edge assembly includes two longitudinal tubular supports that are cambered and fastened together to have a center point of a vertically lower longitudinal tubular support above a straight line extending between respective ends of the vertically lower longitudinal tubular support.

20. The mobile recreational vehicle of claim 19 wherein the two longitudinal tubular supports are formed of one of aluminum and steel and are welded together.

21. The mobile recreational vehicle of claim 20 wherein the two longitudinal tubular supports have a rectangular cross section.

22. The mobile recreational vehicle of claim 1 wherein the cambered assembly includes at least two longitudinal tubular supports of a rectangular cross section welded together so that a vertically lower longitudinal support has a center point above a straight line extending between respective ends of the vertically lower longitudinal tubular support to counter any sagging of the opening in the side wall.

23. The mobile recreational vehicle of claim 22 wherein a ceiling support arch is coupled to a top surface of a transverse cantilever support member.

24. The mobile recreational vehicle of claim 22 wherein a lower transverse support is positioned in the floor assembly beneath and aligned with the adjustable ceiling support.

25. The mobile recreational vehicle of claim 24 wherein a ceiling arch support is positioned in the ceiling assembly above and aligned with the adjustable ceiling support.

* * * * *